United States Patent [19]
Crouse et al.

[11] Patent Number: 5,936,357
[45] Date of Patent: Aug. 10, 1999

[54] ELECTRONIC BALLAST THAT MANAGES SWITCHING FREQUENCIES FOR EXTRINSIC PURPOSES

[75] Inventors: Kent E. Crouse; Patrick J. Keegan; Ronald J. Bezdon, all of Schaumburg, Ill.

[73] Assignee: Energy Savings, Inc., Schaumburg, Ill.

[21] Appl. No.: 09/122,231

[22] Filed: Jul. 24, 1998

[51] Int. Cl.$^6$ .................................. H05B 37/02
[52] U.S. Cl. .................. 315/247; 315/307; 315/308; 315/DIG. 4; 315/DIG. 7
[58] Field of Search .................. 315/247, 225, 315/307, 308, 224, 244, DIG. 4, DIG. 7; 363/59, 60

[56] References Cited

U.S. PATENT DOCUMENTS

| | | | |
|---|---|---|---|
| 5,089,753 | 2/1992 | Mattas | 315/225 |
| 5,422,547 | 6/1995 | Brownell | 315/DIG. 4 |
| 5,680,015 | 10/1997 | Bernitz et al. | 315/291 |
| 5,798,620 | 8/1998 | Wacyk et al. | 315/DIG. 4 |

OTHER PUBLICATIONS

Greenfield "Using Microprocessors and Microcomputers The 6800 Family" 1981 p. 10.

*Primary Examiner*—Michael B Shingleton
*Attorney, Agent, or Firm*—Paul F. Wille

[57] ABSTRACT

A microprocessor controlled, electronic ballast operates a lamp at nominal settings and shifts the operation of the ballast away from nominal settings to reduce interference. The shift is randomized by a test—flip—[shift] routine that prevents all ballasts from attempting the same correction at the same time. On DC input voltage, the frequency of the boost controller is varied to reduce EMI. The ballast operates in bands according to the input voltage. Some bands correspond to full brightness, some to a fixed amount of dimming, and some to a variable amount of dimming. In the event of an abrupt change in load, the microprocessor changes the frequency of the inverter, thereby reducing output power and gradually unloading the boost circuit and maintaining power to the microprocessor.

25 Claims, 3 Drawing Sheets

ELECTRONIC BALLAST THAT MANAGES SWITCHING FREQUENCIES FOR EXTRINSIC PURPOSES

BACKGROUND OF THE INVENTION

This invention relates to electronic ballasts for gas discharge lamps and, in particular, to an electronic ballast having a microprocessor for managing the switching frequencies of the boost circuit and the inverter.

A fluorescent lamp is an evacuated glass tube with a small amount of mercury in the tube. The tube is lined with an adherent layer of a mixture of phosphors. Some of the mercury vaporizes at the low pressure within the tube and a filament in each end of the tube is heated to emit electrons into the tube, ionizing the gas. A high voltage between the filaments causes the mercury ions to conduct current, producing a glow discharge that emits ultraviolet light. The ultraviolet light is absorbed by the phosphors and re-emitted as visible light. "Instant start" lamps do not have heated filaments but rely on a very high starting voltage to initiate a discharge between specially designed electrodes in each end of the lamp.

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. A "magnetic" ballast is an inductor in series with the lamp and is more efficient than a resistor but is physically large and heavy. A large inductor is required because impedance is a function of frequency and power lines operate at low frequency (50–60 Hz.)

An electronic ballast typically includes a rectifier for changing the alternating current (AC) from a power line to direct current (DC) and an inverter for changing the direct current to alternating current at high frequency, typically 25–60 kHz. Electronic ballasts also include a boost circuit between the rectifier and the inverter. As used herein, a "boost" circuit is a circuit that increases the DC voltage, e.g. from approximately 180 volts (assuming a 120 volt input) to 300 volts or more, for operating a lamp and for providing power factor correction. "Power factor" is a figure of merit indicating whether or not a load in an AC circuit is equivalent to a pure resistance, i.e. indicating whether or not the voltage and current are in phase. It is preferred that the load be the equivalent of a pure resistance (a power factor equal to one).

The boost circuit and the inverter each include switching transistors that operate at various frequencies during normal operation of a ballast. The boost circuit changes frequency with the line voltage to produce high power factor. The inverter typically includes a series resonant, direct coupled output, which means that the output voltage and the output current can be adjusted by changing frequency.

The frequency of the inverter at any given moment is relatively constant during normal operation, due, in part, to the use of ceramic resonators in microprocessor controlled ballasts, and therein lies a problem. A plurality of such ballasts will operate on very nearly the same frequency under normal operating conditions. The problem is that the frequencies are very nearly the same, but not exactly the same. When the frequencies are not exactly the same, the ballasts interfere with each other.

A linear lamp, such as a four foot long T8 fluorescent lamp, has a considerable distributed capacitance between the discharge within the tube and a fixture in which the lamp is mounted, which acts as a ground plane. The capacitance enables part of the lamp current to flow through the lamp tube into the ground plane and back to the ballast. The wires connecting a lamp to a ballast may provide additional capacitive coupling. When two or more ballasts are connected to lamps that are close to each other, the current from one ballast can return through the other ballast and vice-versa. When the inverters in the ballasts are operating at nearly the same frequency, e.g. within 1–50 Hz of each other, visible beat frequencies (flicker) can occur. The flicker is at least annoying and could be interpreted as incipient lamp failure or incipient ballast failure, leading to pointless replacement and frustration.

Another kind of interference is electromagnetic interference (EMI). The frequency of the boost circuit is continuously changing in normal operation but becomes constant if the applied voltage is direct current, as it is in some emergency lighting configurations and in areas supplied by direct current. Although the input to a ballast is filtered to reduce (EMI), some of the high frequency signal from the boost circuit will pass through the filter. The filter typically used with an electronic ballast is more than adequate if the boost circuit is constantly changing frequency because the EMI is spread over many frequencies. If the ballast is operated on DC, the EMI is concentrated at a single frequency and the ballast may not comply with governmental or quasi-governmental specifications.

It is known in the art to provide self-dimming when the input voltage is reduced, as in a brownout by a power company. "Self-dimming" is a reduced power output solely in response to a reduced line voltage, without a separate control line or control signal to the ballast. It is also known in the art to provide a universal input voltage (110–277 volts, DC/50–60 Hz.). A problem with a device providing a universal input is that the device automatically draws more current when input voltage is reduced, which interferes with the power company's ability to control power distribution. It is desired to have both universal input voltage and self-dimming.

In general, the problem is one of managing the switching frequencies within an electronic ballast, as opposed to simply letting the ballast determine its own operating points. Frequency management is not what is disclosed in U.S. Pat. No. 5,680,015 (Bernitz et al.), which describes a ballast for a high intensity discharge (HID) lamp wherein a microprocessor controls the frequency of the inverter to avoid mechanical resonances within the HID lamp. Specifically, the Bernitz et al. patent discloses testing the lamp for viable operating frequencies within a range of frequencies. A list of viable operating frequencies is stored in memory. If mechanical resonance is detected, causing the lamp to flicker, the microprocessor changes to another of the frequencies from the list. Thus, the ballast described in the Bernitz et al. patent is optimizing operation of the lamp itself, an intrinsic purpose.

Frequency management also arises, for example, in response to abrupt changes in condition. When a boost converter provides power factor correction, it is necessary that the frequency response of the converter be less than twice the line frequency. Low frequency response leads to very slow response to transient conditions, e.g. lamp removal. If a boost is running at full power and is suddenly unloaded, the output from the boost can well exceed maximum voltage ratings of components within the ballast. When the boost responds to the voltage spike and shuts off, it may remain shut off for so long that it shuts off power for the control circuitry, including a microprocessor controlling the ballast. If the microprocessor turns off and turns on, it begins a cold start sequence that may be inappropriate for the conditions, e.g. parameter tables may be reset to default values. It is desired to provide a controlled response to abrupt changes in condition that does not turn off the microprocessor.

In view of the foregoing, it is therefore an object of the invention to provide an electronic ballast that manages the switching frequencies in an electronic ballast for extrinsic purposes.

A further object of the invention is to provide an electronic ballast that manages the frequency of the boost circuit for reduced EMI.

Another object of the invention is to provide an electronic ballast that manages the frequency of the inverter for reduced interference with other ballasts.

A further object of the invention is to provide an electronic ballast that minimizes coupling to other ballasts.

Another object of the invention is to provide an electronic ballast that shifts the frequency of operation of an electronic ballast to reduce or eliminate interference.

A further object of the invention is to provide a ballast with both universal input voltage and self-dimming (brown-out) capability.

Another object of the invention is to provide a boost powered microprocessor that can respond to abrupt changes in condition without turning off.

SUMMARY OF THE INVENTION

The foregoing objects are achieved by a microprocessor controlled, electronic ballast that operates a lamp at nominal settings and shifts the operation of the ballast away from the nominal settings to reduce interference. As used herein, "nominal" means the voltages and currents specified by a manufacturer for starting and operating a lamp (or the corresponding frequencies to produce the voltages and currents). The shift is randomized by a test—flip—[shift] routine that prevents all ballasts from attempting the same correction at the same time. On DC input voltage, the frequency of the boost controller is varied to reduce EMI. The ballast operates in preselected bands according to the input voltage. Some bands correspond to full brightness, some to a fixed amount of dimming, and some to a variable amount of dimming. The frequency of the inverter ramps upward in response to a fault, thereby reducing output power and gradually unloading the boost circuit and maintaining power to the microprocessor.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
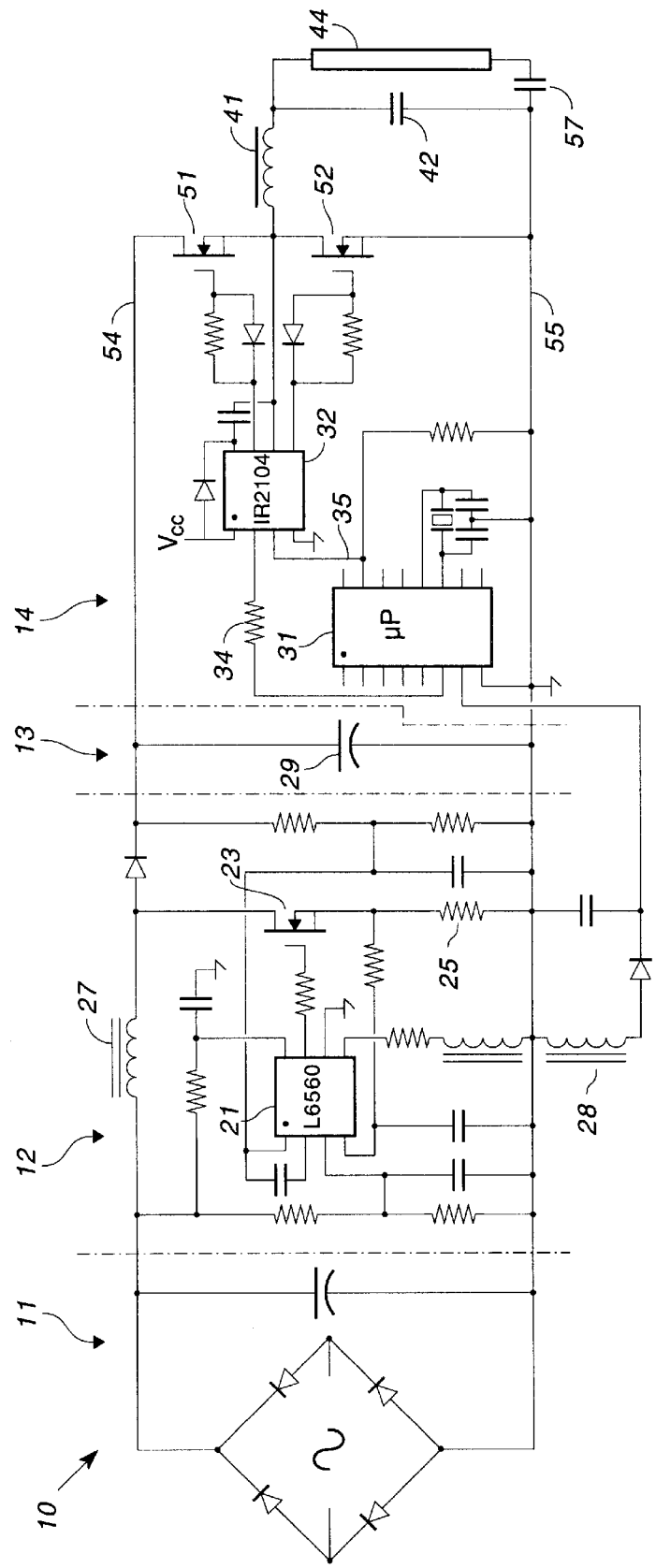
FIG. 1 is a schematic of an electronic ballast constructed in accordance with a preferred embodiment of the invention.

FIG. 1 illustrates a ballast constructed in accordance with the invention. In FIG. 1, pin 1 of each integrated circuit is indicated by a small dot and the pins are numbered consecutively counterclockwise. Ballast 10 includes converter section 11 for producing DC from line voltage, boost section 12 for increasing the DC voltage, storage section 13 for storing energy to drive a lamp, and inverter section 14 for driving a lamp.

Figure 5:
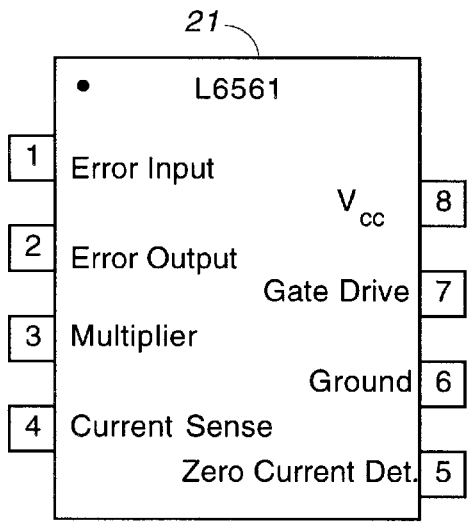
FIG. 5 is a diagram showing the pin-outs of an integrated circuit used for controlling the boost portion of a ballast constructed in accordance with one embodiment of the invention.

In one embodiment of the invention, boost section 12 includes boost controller 21 implemented as an L6561 power factor correction circuit as sold by SGS-Thomson Microelectronics. FIG. 5 is a diagram of the pin designations for this particular integrated circuit. In FIG. 1, boost section 12 is essentially the same as the circuit recommended in the data sheets describing the L6561 integrated circuit.

Controller 21 drives transistor 23 at a frequency determined, in part, by the voltage across resistor 25, which provides feedback for improving power factor. When transistor 23 conducts, current flows through inductor 27, storing energy in a magnetic field. When transistor 23 stops conducting, the magnetic field collapses and the voltage induced in inductor 27 is added to the voltage from rectifier section 11, thereby increasing the voltage on bulk capacitor 29. Boost section 12 also includes auxiliary inductor 28 magnetically coupled to inductor 27 for providing power for microprocessor 31. If boost section 12 turns off for more than one second or so, microprocessor 31 is shut off.

Microprocessor 31 is coupled to two inputs of driver circuit 32. Specifically, high frequency pulses are coupled through resistor 34 to pin 2 of driver 32. Pin 3 of driver 32 is a disable input and is coupled to another output of microprocessor 31. In the event of a fault, disable line 35 is brought low, thereby shutting off the inverter. Inverter 14 includes what is known as a half bridge, series resonant, direct coupled output in which inductor 41 and capacitor 42 are the series resonant elements and lamp 44 is coupled in parallel with capacitor 42. Transistors 51 and 52 alternately connect inductor 41 to high voltage rail 54 and to common rail 55, producing a square wave signal that is converted by the resonant circuit into a sinusoidal signal and is level shifted by half bridge capacitor 57 to be symmetrical about common.

Figure 2:
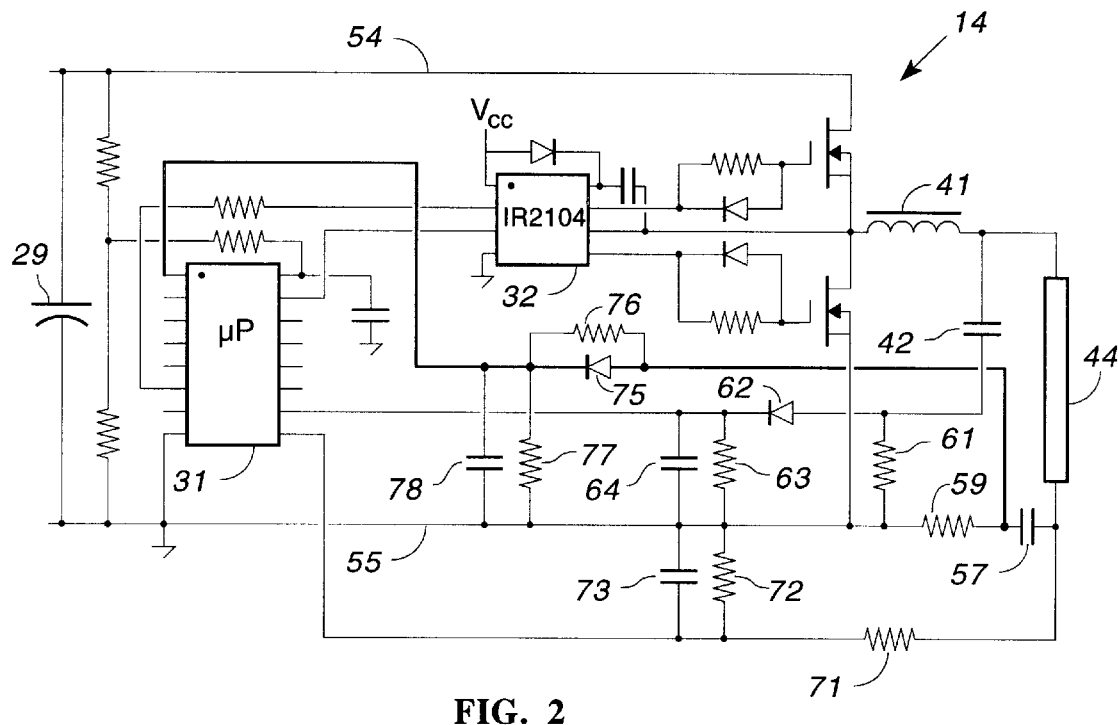
FIG. 2 is a schematic illustrating the inverter portion of the ballast in greater detail.

FIG. 2 illustrates inverter section 14 in greater detail, showing additional circuitry for fault detection. Resistor 61 is in series with resonant capacitor 42 and provides a signal indicative of the AC voltage across lamp 44. This voltage is rectified by diode 62 and the signal is filtered by a low pass filter including resistor 63 and capacitor 64. The filtered, rectified signal is coupled to pin 10 of microprocessor 31. This pin is programmed as an input and has analog to digital (A/D) conversion capability.

If the voltage on pin 10 is moderately excessive for a prolonged period, e.g. 120% of normal for two consecutive five second periods, microprocessor 31 shuts off the inverter until the ballast is reset. If the voltage on pin 10 is at the high voltage limit of the ballast for ten milliseconds, then microprocessor 31 shuts off the inverter until the ballast is reset by temporarily shutting off electrical power to the ballast or by removing the lamp and replacing it. The magnitudes and times are determined by the program stored in microprocessor 31. A variety of other functions are available based upon the data from just this one input; for example, lumen maintenance and lamp recognition.

The DC bias on half bridge capacitor 57 is coupled by resistor 71 to pin 9 of microprocessor 31 after filtering by a low pass RC network including resistor 72 and capacitor 73. Pin 9 is also programmed as an input and has A/D capability. The voltage on half-bridge capacitor 57 is useful for determining end of life of a lamp, among other functions.

Resistor 59 is a small, e.g. 10 Ω or less, resistor in series with half bridge capacitor 57 for converting lamp current into voltage. The voltage is rectified by diode 75, filtered by resistor 77 and capacitor 78, and coupled to pin 1 of microprocessor 31. Resistor 76 improves ripple detection. In normal operation, the voltage on resistor 59 is relatively constant. If the variation in voltage exceeds a predetermined threshold, then the microprocessor enters a routine to avoid interference. Specifically, the microprocessor randomly "flips a coin" on whether or not to shift frequency, and if the outcome is "yes", then shifts frequency a small amount in chosen direction.

The microprocessor will "lock" the frequency setting after a few seconds so as not to vary too far from the nominal switching frequency for the lamp. Any random event can be used for the flip, e.g. whether the lowest order bit in the last A/D conversion was even or odd, or a random number generator routine can be used for the flip. By randomly choosing whether or not to change frequency, and in what direction, a plurality of microprocessors in closely adjacent fixtures are unlikely to do the same thing at the same time, thereby eliminating flicker. The settings are stored in memory corresponding to "full power." Thus, if the microprocessor dims the lamp, the inverter does not return to the switching frequency that caused flicker when dimming is reduced.

One could eliminate resistor 59 and the associated components and avoid interference by simply dithering the operating frequency of the inverter to provide an average frequency corresponding to the nominal frequency for a lamp. Alternatively, one could step through a sequence of frequencies, the average of which is the nominal frequency for a given lamp. Either of these two alternatives requires more processor time, which may be undesirable, than occasionally checking lamp current.

Figure 3:
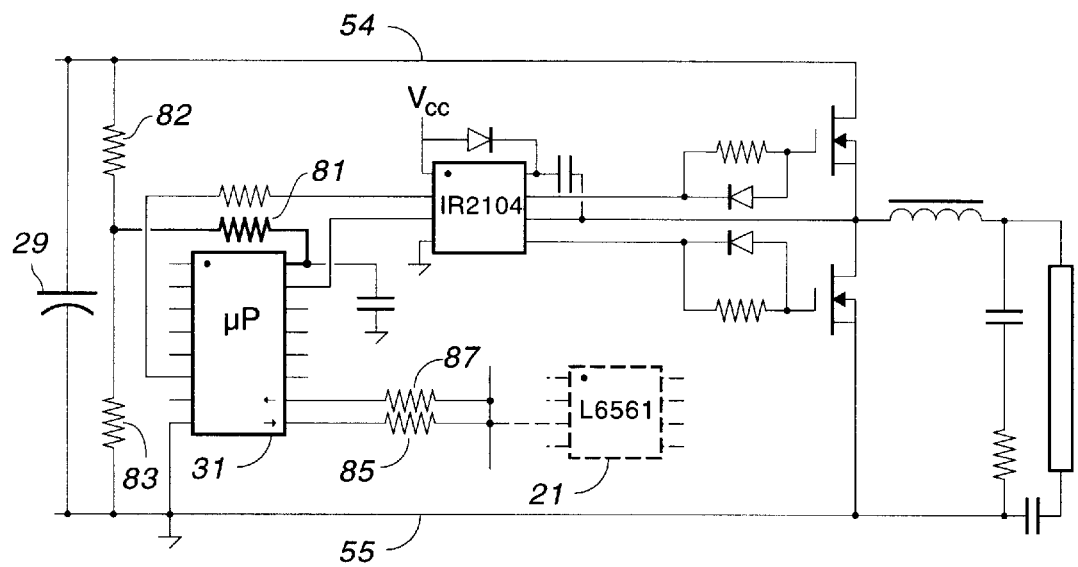
FIG. 3 is a schematic illustrating frequency modulation in accordance with one aspect of the invention.

FIG. 3 illustrates an inverter modified in accordance with another aspect of the invention. Microprocessor 31 monitors high voltage rail 54 through resistor 81 coupling pin 16 to the junction of resistors 82 and 83. Resistors 82 and 83 divide the rail voltage to a suitable level for microprocessor 31. Because boost controller 21 (FIG. 1) is constantly changing frequency and changing the amount of boost, high voltage rail 54 has a slight ripple. If microprocessor 31 detects no ripple, then the ballast must be connected to a source of DC. If so, then the EMI at the input terminals of the ballast is concentrated at a single frequency and the amplitude of the EMI into the power source can be excessive.

The circuit of FIG. 3 overcomes this problem by misleading boost controller 21, causing the boost controller to change frequency. Specifically, pin 9 of microprocessor 31 is configured as an output port and is coupled to pin 3 of boost controller 21 by resistor 85. When pin 9 is high (5 volts), the voltage is increased on pin 3 and boost controller 21 responds by changing frequency. When pin 9 is low (approximately zero volts), the voltage on pin 4 is decreased and boost controller 21 responds by changing frequency. By toggling the frequency of the boost circuit, EMI is reduced.

Alternatively, one could provide a bias signal from microprocessor 31 to pin 4 of boost controller 21, the frequency control pin. Whether by pin 3 or pin 4, the effect is the same, a reduction of interference.

Figure 4:
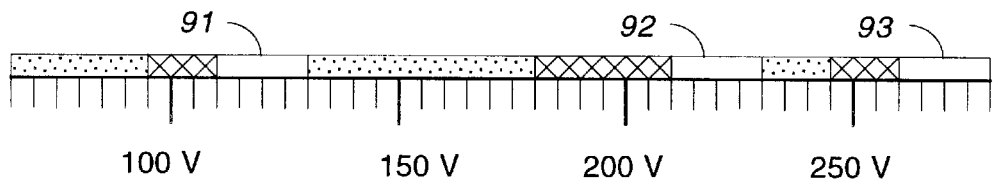
FIG. 4 illustrates the different voltage bands of operation of an electronic ballast constructed in accordance with the invention.

Resistor 87 couples an input port of microprocessor 31 to pin 3 of boost controller 21. Pin 3 senses line voltage decreases (see FIG. 1) and, by monitoring the line voltage, the output power can be adjusted to allow the ballast to respond to power company brownouts. FIG. 4 illustrates a plurality of bands of input voltage. Band 91 represents the range for normal operation at a nominal 120 volts, band 92 represents the range for normal operation at a nominal 220 volts, and band 93 represents the range for normal operation at a nominal 277 volts.

If the input voltage is reduced and enters a cross-hatched area, microprocessor 31 (FIG. 3) interprets this event as a brownout and reduces power proportionately or by a fixed amount, e.g. ten percent. If the input voltage is reduced further and enters a stippled area, microprocessor 31 gradually increases power to approach normal operating levels at the next lower nominal line voltage. The dimming can be linearly or non-linearly related to input voltage as desired. The size of the bands can be adjusted as desired.

Figure 6:
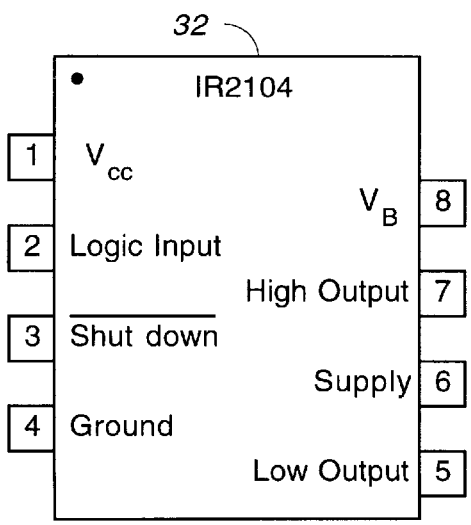
FIG. 6 is a diagram showing the pin-outs of a driver circuit used for controlling the inverter portion of a ballast constructed in accordance with one embodiment of the invention.
Figure 7:
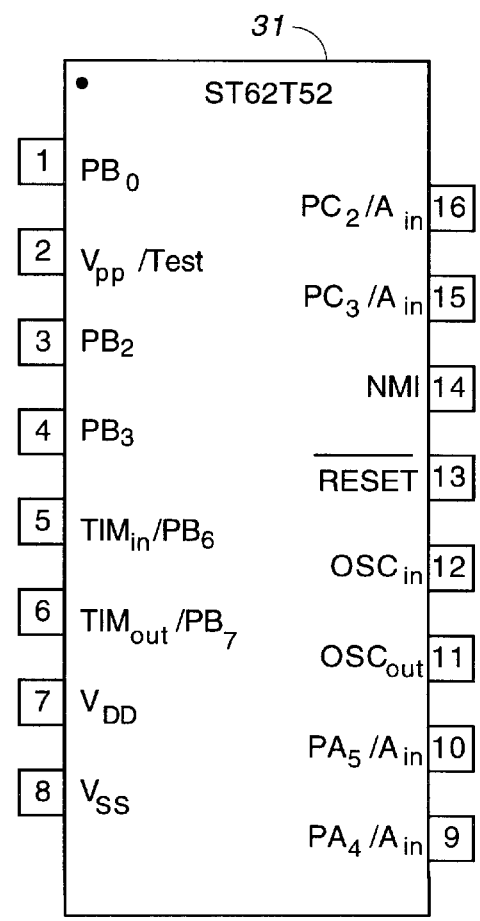
FIG. 7 is a diagram showing the pin-outs of a microprocessor used for controlling a ballast constructed in accordance with one embodiment of the invention.

FIG. 6 illustrates the pin designations for driver circuit 32, implemented as an IR2104 driver circuit as sold by International Rectifier Corporation. FIG. 7 is a diagram indicating the pin designations for a particular microprocessor, namely the 62T52 microprocessor as sold by SGS-Thomson Microelectronics. The ports, designated $PA_x$, $PB_x$, and $PC_x$, are programmable under software control. Other integrated circuits could be used instead.

Referring to FIG. 1, in the event that boost section 12 is operating a full power at the very time that lamp 44 is removed from the circuit, microprocessor 31 senses the increase in output voltage (pin 10, FIG. 2) and begins increasing the switching frequency of the inverter, moving the frequency away from resonance. Preferably this reverse sweep takes about one hundred milliseconds to complete, during which time boost controller 21 recognizes the change in load and begins to decrease output. Boost controller 21 can respond to the changing load on a time scale of 100 milliseconds. By increasing the frequency of the inverter, thereby decreasing the load, microprocessor 31 avoids overshooting the rail voltage and the resulting shutdown of the boost circuit.

The invention thus provides an electronic ballast that shifts the operation of an electronic ballast to reduce or eliminate interference. The ballast manages the frequency of the boost circuit for reduced EMI and manages the frequency of the inverter for reduced interference with other ballasts, for dimming, and for accommodating abrupt changes in load.

Having thus described the invention, it will be apparent to those of skill in the art that many modifications can be made with the scope of the invention. For example, many suitable components exist for the functions of power factor correction, microprocessor, and level shifting driver. A programmable logic array or other digital controller can be used instead of a microprocessor. A reference to memory, I/O, or other functions "in" the microprocessor is not intended to exclude external memory, external I/O circuitry, etc. The converter section can be a buck, buck/boost, or any other topology that can provide the required rail voltages from the various power line voltages. The output can be a full bridge instead of a half bridge and can use a different resonant circuit. The ballast can drive more than one lamp, either rapid start (with heated filaments) or instant start.

In the event of coupling between ballasts, one could eliminate flicker by synchronizing the ballasts. It is somewhat easier to change the frequency of the inverter to avoid a visible beat frequency than to achieve synchronization, particularly if several ballasts are involved. One could shift inverter frequency no more than a predetermined number of times, rather than lock the frequency after a few seconds. FIG. 3 is not inconsistent with FIG. 2 in the use of pins 9 and 10 on microprocessor 31. Microprocessor 21 has nine I/O pins (FIG. 7). Any of the I/O pins can be assigned any given function. FIG. 3 illustrates another aspect of the invention with the fewest intersecting lines. The reverse sweep, as the forward sweep during starting, can be continuous or discontinuous. If discontinuous, the sweep includes several steps for a incremental transition from full power to low power.

What is claimed is:

1. A method for operating an electronic ballast for a gas discharge lamp, said ballast having a boost circuit switching at a first nominal frequency and an inverter switching at a second nominal frequency, said method comprising the steps of:

operating the ballast at nominal settings by having the boost circuit switch at the first nominal frequency and the inverter switch at the second nominal frequency; and shifting the frequency of one of the boost circuit and the inverter away from the nominal setting to reduce interference.

2. The method as set forth in claim 1 wherein the shift lasts as long as power is applied to the ballast.

3. The method as set forth in claim 1 wherein said shifting step includes varying the frequency of the inverter.

4. The method as set forth in claim 3 wherein said shifting step includes the steps of:

testing to see if there is interference with another ballast;
   randomly choosing whether or not to shift frequency;
   shifting frequency if the choice is yes.

5. The method as set forth in claim 1 wherein said shifting step includes varying the frequency of the boost circuit from the second nominal frequency.

6. The method as set forth in claim 5 wherein said variations are momentary.

7. The method as set forth in claim 1 wherein said shifting step includes the step of changing the switching frequency of the inverter for dimming.

8. The method as set forth in claim 7 wherein said ballast operates over a continuous range of input voltages covering a plurality of nominal line voltage bands and provides full power to a lamp when operating in a nominal line voltage and provides less than full power to a lamp when not operating at a nominal line voltage.

9. The method as set forth in claim 1 wherein said shifting step includes the step of sweeping the switching frequency of the inverter for reducing the output voltage when a lamp is removed, thereby preventing the boost circuit from turning off.

10. In an electronic ballast including a universal input having a boost circuit, a bulk capacitor coupled to said boost circuit, an inverter coupled to said bulk capacitor, and a microprocessor coupled to said inverter for controlling the switching frequency of said inverter, wherein said inverter includes an output for coupling to at least one gas discharge lamp, the improvement comprising:

said microprocessor contains a stored program for managing the switching frequencies in said ballast by starting and initially operating said inverter at a first nominal frequency and for shifting the operation of the inverter away from the nominal frequency to reduce interference.

11. The ballast as set forth in claim 10 wherein said microprocessor causes said inverter to change switching frequency.

12. The ballast as set forth in claim 11 wherein said microprocessor causes said inverter to change switching frequency when the lamp is removed from said output while power is applied to said ballast.

13. The ballast as set forth in claim 11 wherein said microprocessor causes said inverter to change switching frequency and remain at the new frequency until power is removed from said ballast.

14. The ballast as set forth in claim 11 wherein said microprocessor is coupled to said boost circuit and causes said boost circuit to change switching frequency away from a second nominal frequency.

15. The ballast as set forth in claim 10 wherein said microprocessor is coupled to said rectifier and monitors input voltage, said microprocessor reducing output power when the input voltage is not a nominal line voltage.

16. The ballast as set forth in claim 15 wherein said inverter includes a series resonant output and said microprocessor reduces output power by increasing the switching frequency of said inverter.

17. The ballast as set forth in claim 15 wherein said microprocessor reduces output power by a fixed amount when the input voltage is not a nominal line voltage.

18. A method for operating an electronic ballast for a gas discharge lamp, said ballast having a boost circuit switching at a first nominal frequency and an inverter switching at a second nominal frequency, said method comprising the steps of:

operating the ballast at nominal settings by having the boost circuit switch at the first nominal frequency and the inverter switch at the second nominal frequency;

sensing interference with another ballast having an inverter operating at approximately said second nominal frequency; and shifting the frequency of the inverter away from said second nominal frequency to reduce said interference.

19. The method as set forth in claim 18 and further including the step of:

operating said inverter at said shifted second frequency for as long as power is applied to said ballast.

20. The method as set forth in claim 18 wherein said shifting step is preceded by the step of:

randomly picking an increase in frequency or a decrease in frequency.

21. The method as set forth in claim 20 wherein said picking step is preceded by the steps of:

randomly choosing whether or not to change frequency; and skipping said picking step and said shifting step if not changing frequency is chosen.

22. An electronic ballast for powering a gas discharge lamp, said ballast comprising:

a universal input operating over a plurality of nominal input voltages;

an inverter coupled to said universal input;

a microprocessor coupled to said inverter and to said universal input for controlling the switching frequencies of the inverter and the universal input;

wherein more than one nominal input voltage corresponds to the same switching frequency of the inverter; and wherein said microprocessor increases the switching frequency of the inverter when the input voltage is less than a nominal value by a predetermined amount.

23. The electronic ballast as set forth in claim 22 wherein said microprocessor decreases the switching frequency of the inverter when the input voltage decreases to the next lower nominal voltage.

24. An electronic ballast for powering a gas discharge lamp, said ballast comprising:

a universal input operating over a plurality of nominal input voltages of alternating current or direct current, said universal input including a boost circuit operating at a substantially fixed frequency when said input is coupled to a source of direct current, thereby producing a large amplitude output signal at a single frequency;

a microprocessor coupled to said universal input, said microprocessor continuously varying the switching frequency of said boost circuit when said ballast is coupled to a source of direct current, thereby reducing EMI by broadening the frequency spectrum produced by the boost circuit.

25. An electronic ballast for powering a gas discharge lamp, said ballast comprising:

a boost circuit;

an inverter, coupled to said boost circuit, for powering said lamp;

a microprocessor coupled to said inverter for controlling the switching frequency of the inverter;

wherein said microprocessor gradually increases the frequency of said inverter when a lamp is disconnected from said ballast.

* * * * *